(12) United States Patent
Walaszek et al.

(10) Patent No.: US 11,385,115 B2
(45) Date of Patent: Jul. 12, 2022

(54) DEVICE FOR INSPECTING CLAMPING MEANS BY ULTRASOUNDS AND METHOD IMPLEMENTING THE DEVICE

(71) Applicant: Centre Technique des Industries Mécaniques, Senlis (FR)

(72) Inventors: Henri Walaszek, Montmagny (FR); Patrick Bouteille, Pontpoint (FR)

(73) Assignee: CENTRE TECHNIQUE DES INDUSTRIES MÉCANIQUES

( * ) Notice: Subject to any disclaimer, the term of this patent is extended or adjusted under 35 U.S.C. 154(b) by 324 days.

(21) Appl. No.: 16/614,615

(22) PCT Filed: May 16, 2018

(86) PCT No.: PCT/FR2018/051181
§ 371 (c)(1),
(2) Date: Nov. 18, 2019

(87) PCT Pub. No.: WO2018/211217
PCT Pub. Date: Nov. 22, 2018

(65) Prior Publication Data
US 2020/0182720 A1    Jun. 11, 2020

(30) Foreign Application Priority Data

May 17, 2017    (FR) ........................................ 1754346

(51) Int. Cl.
*H01F 7/04*        (2006.01)
*G01L 5/24*        (2006.01)

(52) U.S. Cl.
CPC ................ *G01L 5/246* (2013.01); *H01F 7/04* (2013.01)

(58) Field of Classification Search
CPC .................................. G01L 5/246; H01F 7/04
See application file for complete search history.

(56) References Cited

U.S. PATENT DOCUMENTS 3,889,381 A * 6/1975 Brown .................... G01B 5/025
33/506
4,649,749 A * 3/1987 Hazony .................. G01B 17/02
73/597

(Continued)

FOREIGN PATENT DOCUMENTS

JP    H07-333085 A    12/1995

OTHER PUBLICATIONS

International Search Report dated Jul. 26, 2018 in corresponding PCT International Application No. PCT/FR2018/051181.

(Continued)

*Primary Examiner* — Jamel E Williams
(74) *Attorney, Agent, or Firm* — Ostrolenk Faber LLP

(57) ABSTRACT

A device for inspecting clamping means, including an electromagnetic ultrasonic transducer including a winding for generating pulsed eddy currents on the surface of a clamping element, built into a system for generating a magnetic field including a cylindrical magnet arranged above the winding with the axis of rotation thereof coinciding with the axis of the winding and a magnetic circuit surrounding the magnet and the winding to guide the generated magnetic field so that the field lines pass obliquely towards the axis of the coil through an interface plane with the clamping element, opposite the winding, the interaction of the field lines and pulsed eddy currents being suitable for simultaneously generating longitudinal and transverse ultrasonic waves in the clamping element.

8 Claims, 1 Drawing Sheet

(56) References Cited

U.S. PATENT DOCUMENTS

| | | | | | |
|---|---|---|---|---|---|
| 5,016,474 | A | * | 5/1991 | Hazony | G01B 17/02 |
| | | | | | 374/119 |
| 5,058,439 | A | * | 10/1991 | Carpenter | G01L 5/246 |
| | | | | | 73/862.21 |
| 5,226,327 | A | * | 7/1993 | Fassina | B25B 23/1425 |
| | | | | | 73/761 |
| 5,263,372 | A | * | 11/1993 | Matsuzaki | F16C 19/522 |
| | | | | | 73/593 |

OTHER PUBLICATIONS

Written Opinion dated Jul. 26, 2018 in corresponding PCT International Application No. PCT/FR2018/051181.

H. Walaszek et al. "Ultrasonic Stress Measurement: Application to Preload Assessment on Already Tightened Bolts," Materials Science Forum, Jan. 1, 2006, pp. 459-464, XP055447661, DOI: http://dx.doi.org/10.4028/www.scientiric.net/MSF.524-525.459; URL: http://www.ndt.net/article/wcndt2016/papers/tu1c1.pdf (retrieved Feb. 2, 1018).

M. Vasiljevic et al., "Pipe wall damage detection by electromagnetic acoustic transducer generated guided waves in absence of defect signals," The Journal of the Acoustical Society of America, vol. 123, No. 5, pp. 2591-2597, May 2008.

H. Walaszek et al., "Application of Combined Ultrasonic Stress Measurement Methods to Preload Assessment on Already Tightened Bolts," Les Journees Cofrend 2014, 9 pages; accessible at the address http://www.ndt.net (with English abstract).

* cited by examiner

DEVICE FOR INSPECTING CLAMPING MEANS BY ULTRASOUNDS AND METHOD IMPLEMENTING THE DEVICE

CROSS-REFERENCE TO RELATED APPLICATIONS

The present application is a 35 U.S.C. §§ 371 national phase conversion of PCT/FR2018/051181, filed May 16, 2018, which claims priority to French Patent Application No. 1754346, filed May 17, 2017, the contents of which are incorporated herein by reference. The PCT International Application was published in the French language.

TECHNICAL FIELD

The present invention relates to a device for controlling tightening by ultrasound, suitable for being electromagnetically coupled to a tightening element to be controlled, such as a screw, bolt or stud bolt for example, said element being under a mechanical tightening stress that it is sought to determine.

BACKGROUND OF THE INVENTION

Tightening controlled by ultrasound is a reliable and nondestructive technique that is well-known. It is based on the dependence of the propagation speed of ultrasonic waves on the state of the stress in the screw or bolt. The nondestructive character and cost of the required equipment are the main advantages favoring the use of this technique.

The corresponding measurements are conventionally carried out by virtue of an ultrasonic transducer that is coupled to one end of the tightening element to be inspected, said transducer being used both as emitter and detector. Thus, the transducer generates an ultrasonic wave that is transmitted into the tightening element and the transducer is furthermore designed to detect the echo of the wave reflected by the opposite end of the tightening element. The measurement performed delivers the round-trip propagation time of the ultrasonic wave in the tightening element, which is also called the time of flight.

The time of flight in the tightening element is affected by the mechanical stress state within the tightening element and is different from the time of flight without stress, i.e. before tightening. Specifically, the mechanical stress due to the tightening results in two effects: a physical elongation of the tightening element and a variation in the propagation speed of the ultrasonic wave, known as the acoustoelastic effect. Thus, after tightening, the combined influence of the stress on the elongation and on the acoustic speed will result in a variation in the time of flight of the ultrasonic wave with respect to the situation before tightening. Prior acoustic-elastic calibration makes it possible to establish the relationship between the speed and the stress.

In the context of common applications using ultrasonic tightening control, a piezoelectric transducer is conventionally used and, to achieve a good transfer of the wave, the transducer is coupled to the screwing element via a coupling fluid, which ensures the mechanical continuity between the transducer and the material through which the wave propagates. A differential analysis method is employed, which is based on a measurement of the difference between the times of flight of the ultrasonic wave through the unstressed, i.e. not tightened, and stressed tightening element. This method only uses longitudinal waves (compression waves).

In practice, the tightening of tightening elements is controlled in differential mode in two successive phases:
- a calibration phase, in which a standard tightening element (which is representative of whatever must be measured) is loaded (i.e. tightened) under the same conditions as the tightening element to be controlled. The tightening elements are made of the same material, have the same geometry and the same length in the tightened state. The calibration trial is carried out by measuring the times of flight of ultrasonic waves in the tightening element, to which single tensile forces are applied in the elastic domain. Thus, calibration curves (charts) representing the variation in the time of flight as a function of mechanical tensions, i.e. applied load, are obtained.
- a measurement phase in which the time of flight of ultrasonic waves in the tightening element, before and after tightening, are measured. The measured differential time is collated with the calibration curve and allows the tightening stress to be determined.

For a precise measurement it is therefore necessary to know either the time of flight before tightening or the initial length of the screw, in order to deduce therefrom the differential time of flight due to the tightening, and then the stress, via the calibration curves.

A method for controlling tightening by ultrasound, called the bi-wave method, is also known, this method exploiting the time of flight of two types of waves of different nature: longitudinal waves (compression waves) and transverse waves (shear waves), which have a different propagation speed and a different sensitivity to stress. The use of these two types of waves makes it possible to avoid the need to know the exact length of the tightening element without stress, or the need for a zero-stress measurement, as required by the differential method that exploits only ultrasonic compression waves. This method is therefore particularly attractive when the times of flight before tightening are not known, or when the tightening element was not able to be pre-measured from the metrological point of view, with a view to subsequent ultrasonic measurement.

The publication "Apport et limitations des méthodes ultrasonores combinées pour le contrôle de serrage sur assemblages déjà serrés" by H. Walaszek and P. Bouteille, accessible at the address http://www.ndt.net, teaches the principles of tightening control according to the method referred to as the bi-wave method, which exploits compression and shear waves. To implement this bi-wave method, this document describes the use of electromagnetic acoustic transducers (EMATs), instead of piezoelectric transducers, to generate the compression waves and the shear waves. These devices for generating ultrasonic waves in the tightening element to be controlled are based on electromagnetic coupling with the tightening element, allowing a reliable coupling, which is very difficult to guarantee for shear waves with conventional piezoelectric transducers, to be achieved. Furthermore, the electromagnetic coupling removes the need for the coupling fluid conventionally used to transmit the mechanical ultrasonic pulse from the ultrasonic transducer to the end of the tightening element. The presence of this fluid is often considered to be undesirable in certain industrial sectors, for example in the case where tightening control is integrated into a production chain. Lastly, the presence of the coupling fluid makes measurements at high and low temperatures tricky to carry out.

However, although the bi-wave-method-based technique for controlling tightening by ultrasound is proven and promising, it nevertheless needs to be improved if the needs of industry, in particular in terms of reliability, rapidity of implementation and of higher measurement precision, are to be met optimally.

SUMMARY OF THE INVENTION

Thus, one aim of the invention is to provide a device for controlling tightening by ultrasound of the aforementioned type, which meets these needs.

To this end, the present invention provides a device for controlling tightening by ultrasound comprising an electromagnetic ultrasonic transducer suitable for being electromagnetically coupled to a tightening element to be controlled with a view to generating ultrasonic waves in said tightening element and with a view to receiving and analyzing a return signal, in order to determine a first measurement of the time of flight of generated longitudinal ultrasonic waves and a second measurement of the time of flight of generated transverse ultrasonic waves, so as to deduce therefrom a tightening stress within said tightening element, characterized in that said transducer is formed from a flat coil of measurement axis parallel to the longitudinal axis of said tightening element to be controlled, able to generate pulsed eddy currents at the surface of said tightening element to be controlled when said coil is supplied with at least one exciting current pulse, said coil being integrated into a system for generating a magnetic field, said system comprising a cylindrical magnet of magnetization direction parallel to the longitudinal axis of said tightening element to be controlled and placed above said coil so that the axis of revolution of said magnet is substantially coincident with the axis of said coil, and a magnetic circuit that encircles said magnet and said coil with a view to guiding the generated magnetic field so that the field lines pass through obliquely in the direction of the axis of said coil an interface plane between said transducer and the surface of said tightening element to be controlled, plumb with said coil, the interaction of said field lines and of the pulsed eddy currents being suitable for simultaneously generating the longitudinal and transverse ultrasonic waves in said tightening element to be controlled.

Advantageously, said magnetic circuit comprises:
  a conical element formed by a first ferromagnetic polar part having a first end connected to a first pole of said magnet and a free second end of narrow cross section, placed in the plane of said flat coil inside said flat coil,
  an annular peripheral wall of revolution about said axis of revolution, said wall being formed by a second ferromagnetic polar part that is inclined in the direction of the axis of said flat coil from a first end placed in the plane of a second pole of said magnet to a free second end placed in the plane of said flat coil outside said flat coil, said free second ends of said first and second polar parts defining a gap for channeling the magnetic field located in the plane of said flat coil, and
  a cylindrical upper wall of revolution about said axis of revolution, said wall being formed by a third ferromagnetic polar part connected to said second pole of said magnet and securely fastened to said first end of said second polar part.

Advantageously, said annular peripheral wall has an internal face that is located radially away from said magnet and from said conical element, so as to form a housing suitable for receiving a power-supply cable of the coil.

Advantageously, said annular peripheral wall is oriented at substantially 45° with respect to said interface plane.

Preferably, said first, second and third polar parts are made of soft iron.

Preferably, said flat coil is formed from a winding consisting of at least six turns of insulated conductive wire.

Preferably, said magnet is a permanent magnet made of neodymium-iron-boron (NdFeB) or equivalent. As a variant, said magnet may be an electromagnet.

The invention also relates to a method for controlling by ultrasound the tightening of a tightening element, the method being of the type exploiting measurements of the time of flight respectively of a longitudinal ultrasonic wave and of a transverse ultrasonic wave that propagate through said tightening element, so as to deduce therefrom a tightening stress within said tightening element, characterized in that it comprises:
  coupling a device such as described above to said tightening element with a view to simultaneously generating said longitudinal and transverse ultrasonic waves that propagate through said tightening element;
  measuring respective times of flight of said generated longitudinal and transverse ultrasonic waves from return echoes of said longitudinal and transverse ultrasonic waves in a return signal received by said transducer;
  computing the ratio of the measured times of flight of the transverse and longitudinal ultrasonic waves;
  determining said tightening stress from the ratio of the measured times of flight, by reading the tightening stress corresponding to the obtained ratio of the times of flight, from a calibration curve of the ratio of the times of flight as a function of tightening stress.

BRIEF DESCRIPTION OF THE DRAWINGS

Other particularities and advantages of the invention will become apparent on reading the following description of one particular embodiment of the invention, which is given by way of nonlimiting indication, with reference to the appended drawings, in which.

DESCRIPTION OF PREFERRED EMBODIMENTS

Figure 1:
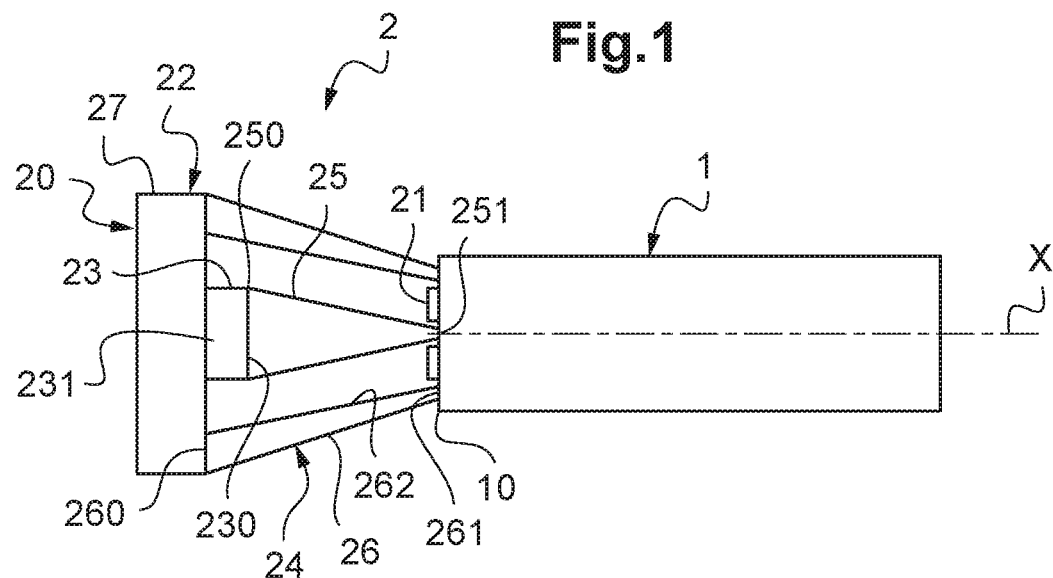
FIG. 1 is a schematic view of the device according to the invention coupled to a screw, with a view to simultaneously generating compression and shear waves in said screw.

The tightening element 1 to be controlled by virtue of the device 2 of the invention comprises a screw in the example of FIG. 1, which has a screw head 10. The device 2 comprises a electromagnetic acoustic transducer 20, i.e. an EMAT, intended to be placed on the screw head 10 so as to allow an ultrasonic signal to be emitted into and received from the screw 1 without acoustic coupling fluid. The transducer 20 is connected to means for exciting pulses and for receiving/amplifying and analyzing the return signal, which means are not shown.

The transducer 20 is placed on the screw head 10 and is suitable for transmitting ultrasonic waves to the end of the screw opposite the screw head and, more precisely, for simultaneously transmitting longitudinal waves (compression waves) and transverse waves (shear waves) according to the principles described below.

The waves transmitted through the screw are defined with respect to the interface plane between the screw and the transducer, which serves as reference for the definition of the polarization of the transverse and longitudinal waves.

The transducer 20 comprises a flat coil 21 (which lies in a plane) that is formed by a coil of electrically conductive wire (referred to as a solenoid or the eddy-current coil) and that is intended to be placed on the surface of the screw head 10 with the axis of the coil, i.e. the axis perpendicular to the plane of the coil 21 and which passes through the coil 21 at its center, parallel to the longitudinal axis X of the screw. The flat coil 21 is for example formed from a winding consisting of six turns of insulated conductive wire. The coil 21 allows pulsed electrical currents of high magnitude to be generated at the surface of the electrically conductive material of the screw head, when said coil is supplied with power by way of the means for exciting high-power pulses of the transducer. The generated pulsed currents, which are referred to as "eddy currents" are contained in planes parallel to the surface of the material and are mainly concentrated in a thickness conventionally referred to as the skin depth. They are intended to interact with a permanent magnetic field created by a system for generating a magnetic field of the transducer 20 into which the coil 21 is integrated.

The coil 21 is integrated into a system 22 for generating a magnetic field of the transducer 20, which has the particularity of being able to create, in the zone located under the coil, i.e. in the vicinity of the interface plane between the transducer and the surface of the screw head, a magnetic field that is inclined in the direction of the longitudinal axis of the screw and that is decomposable into a component collinear to the axis X and a component normal to the axis X. The combination of the eddy currents in the material of the screw and of the generated magnetic field causes the appearance of a so-called Lorentz force at the surface of the material, which causes an ultrasonic wave to propagate through the material. By virtue of the relative orientation of the eddy currents, parallel to the surface of the material and of the inclined magnetic field, the transducer 20 allows a longitudinal pulsed ultrasonic wave and a transverse pulsed ultrasonic wave to be generated simultaneously, said waves simultaneously propagating through the screw. In particular, the transverse waves are generated via the interaction of the currents of the eddy currents parallel to the surface of the conductive material of the screw with the component of the inclined magnetic field collinear to the axis X and the longitudinal waves are generated via the interaction of the eddy currents parallel to the surface of the conductive material with the component of the inclined magnetic field normal to the axis X.

Furthermore, in ferromagnetic materials, a pulsed magnetostrictive force, collinear to the pulsed magnetic field created by the coil when it is supplied with power, combines with the Lorentz force and participates in the generation of the ultrasonic waves.

The advantageous combination of the spatial distribution of the permanent magnetic field and of the pulsed eddy currents allows longitudinal and transverse ultrasonic waves to be simultaneously generated in a given zone of the screw to be controlled. This simultaneity of generation of the longitudinal and transverse waves makes it possible to ensure the insonification of an identical zone of the controlled screw, this having the advantage of increasing the sensitivity of the measurement and of decreasing the dispersions in the measurement of the ultrasonic times of flight of the two longitudinal and transverse waves, which are generated simultaneously in the screw.

These waves, which propagate through the screw, are reflected by the end of the screw and their return echo is detected by the transducer 20, via the inverse effect.

The system 22 for generating the magnetic field of the transducer 20 allowing the inclined magnetic field to be created in the vicinity of the interface plane under the coil 21, comprises, to this end, a cylindrical magnet 23, of magnetization direction parallel to the longitudinal axis X of the screw to be controlled. The magnet 23 is placed above the coil 21, so that the axis of revolution of the magnet 23 is substantially coincident with the axis of the coil 21. The magnet 23 may be a permanent magnet, preferably a neodymium-iron-boron (NdFeB) magnet, or an electromagnet.

The system 22 for generating the magnetic field of the transducer 20 also comprises a magnetic circuit 24 consisting of polar masses encircling the magnet 23 and the coil 21 in order to guide the magnetic field generated by the magnet so as to generate a distribution of the magnetic field in the screw to be controlled able to advantageously interact with the eddy currents generated by the coil 21 in the screw.

Thus, the magnetic circuit 24 associated with the permanent magnet 23 is shaped so that the field lines pass through obliquely, in the direction of the axis of the coil 21, the interface plane between the transducer 20 and the surface of the screw 1 to be controlled, plumb with the coil 23, so that the interaction of these field lines with the pulsed eddy currents simultaneously generates the longitudinal and transverse ultrasonic waves in the screw 1 to be controlled, as explained above.

More precisely, to obtain such a distribution of the field lines, the magnetic circuit 24 comprises a conical element 25, formed by a first ferromagnetic polar part, which has a first end 250 connected to a first pole 230 of the permanent magnet 23 and a free second end 251, of narrow cross section, placed in the plane of the flat coil 21 inside the latter. In other words, the conical element 25 is placed between the first pole of the permanent magnet 23 and the flat coil 21 so that its axis is aligned on the one hand with the axis of revolution of the magnet 23, and on the other hand with the axis of the coil 21.

The magnetic circuit 24 also comprises an annular peripheral wall 26 of revolution about the axis of revolution of the permanent magnet 23, which is formed by a second ferromagnetic polar part that is inclined in the direction of the axis of the flat coil 21 from a first end 260 placed in the plane of a second pole 231 of the permanent magnet 23, opposite to the first pole 230, towards a free second end 261 placed in the plane of the flat coil 21 outside the latter, so that the respective free second ends 251 and 261 of the first and second polar parts 25 and 26 define a gap for channeling the magnetic field generated by the magnet 23, located in the plane of the flat coil 21.

The peripheral annular wall 26 is oriented at substantially 45° with respect to the interface plane between the transducer and the screw. Such an orientation is particularly favorable to obtaining a distribution of the magnetic field in the screw that is able to advantageously interact with the pulsed eddy currents so as to generate both transverse ultrasonic waves and longitudinal ultrasonic waves in the screw to be controlled.

Furthermore, the annular peripheral wall 26 of the magnetic circuit has an internal face 262 that is located radially away from the magnet 23 and from the conical element 25, so as to form a housing 28 suitable for receiving the cabling required to supply power to the coil 21. The magnetic circuit 24 lastly comprises a cylindrical upper wall 27 of revolution about the axis of revolution of the permanent magnet 23, which is formed by a third ferromagnetic polar part connected to the second pole 231 of the magnet 23 and securely fastened to the first end 260 of the second polar part 26 of the magnetic circuit.

Polar parts made of soft iron are preferably used to form the magnetic circuit 24 formed by the central conical element 25, by the annular peripheral wall 26 and by the cylindrical upper wall 27.

The transducer 20 allows the bi-wave method to be applied to tightening control, which uses measurements of the times of flight of two simultaneously generated types of waves (transverse and longitudinal waves) to obtain a measurement of the stress on an element that has already been tightened and the length of which is not known with precision. This method makes it possible to avoid the need to make use of pre-calibrated screws, i.e. the length of which is known or the time of flight of the ultrasonic waves at rest, i.e. before tightening, of which is known.

Figure 2:
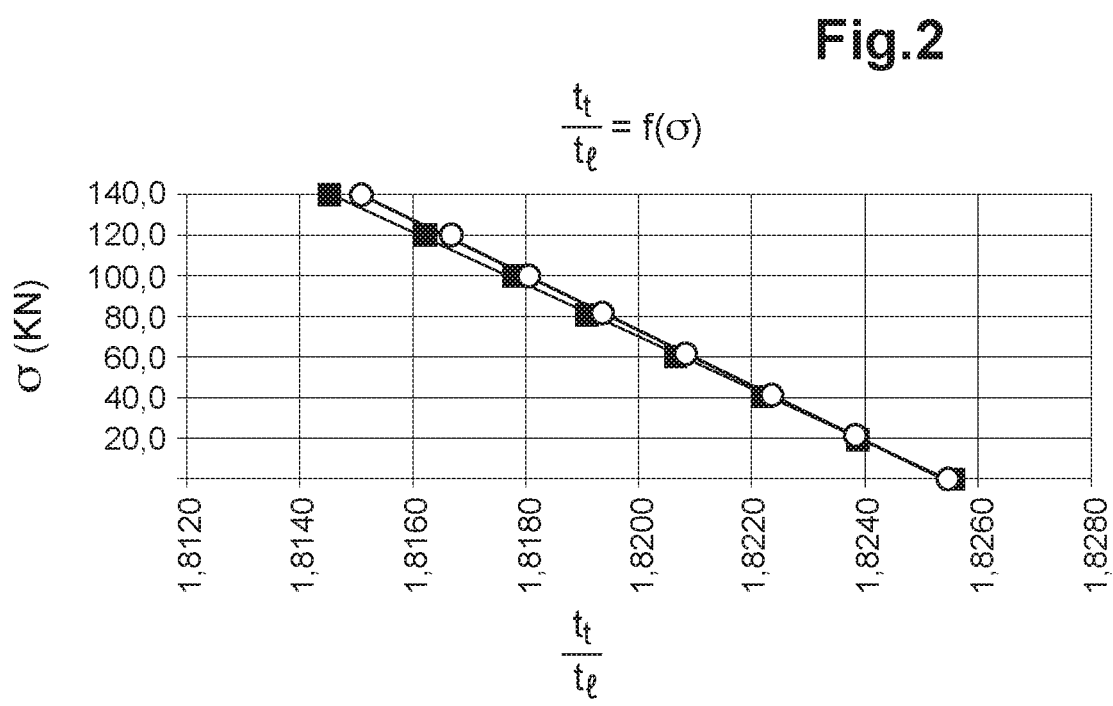
FIG. 2 is an example of a calibration curve used to determine the tightening stress in the screw with the device of the invention.

A calibration curve is constructed from the measurements of the times of flight of the longitudinal wave and of the transverse wave in a calibration screw for various tightening stresses applied to the screw, said curve giving the variable of the ratio of the times of flight of the longitudinal wave and of the transverse wave, plotted on a first axis, as a function of tightening stress, plotted on a second axis. FIG. 2 illustrates an example of such a calibration curve $$\frac{t_t}{t_l} = f(\sigma)$$

giving the ratio $$\frac{t_t}{t_l}$$

between the times of flight $t_t$ and $t_l$, of the transverse wave and of the longitudinal wave, respectively, in a given calibration screw as a function of the stress σ applied to the screw, expressed in kN.

Thus, according to the invention, the tightening of an already tightened screw to be controlled may be controlled without untightening. The transducer 20 described above is placed on the screw head, so as to simultaneously transmit the transverse and longitudinal ultrasonic waves through the screw to be controlled, from the screw head to the end of the screw. These ultrasonic waves, which are transverse and longitudinal, respectively, propagate and are reflected by the end of the screw. The respective return echoes of the generated longitudinal and transverse waves are marked in the return signal received by the transducer 20 by peaks that appear after a time depending on the time of flight of the longitudinal wave and of the transverse wave.

The measurement of the tightening stress applied to the screw to be controlled then consists in exploiting the measurement of these times of flight to compute the ratio between these times of flight measured for the two types of simultaneously emitted waves, then to determine the tightening stress corresponding to the obtained ratio of the times of flight, from a calibration curve of the ratio of the times of flight as a function of stress, such as illustrated in FIG. 2. Thus, a measurement of the tightening stress exerted in the screw is obtained. The advantages of this method are in particular a higher measurement precision, by virtue of the simultaneous insonification of a given zone of the element to be controlled with longitudinal and transverse waves, and a greater measurement speed, by virtue of the use of a single transducer allowing the longitudinal and transverse waves to be generated simultaneously.

The invention claimed is:

1. A device for controlling tightening by ultrasound comprising an electromagnetic ultrasonic transducer suitable for being electromagnetically coupled to a tightening element to be controlled with a view to generating ultrasonic waves in said tightening element and with a view to receiving and analyzing a return signal, in order to determine a first measurement of the time of flight of generated longitudinal ultrasonic waves and a second measurement of the time of flight of generated transverse ultrasonic waves, so as to deduce therefrom a tightening stress within said tightening element, wherein said transducer is formed from a flat coil of measurement axis parallel to the longitudinal axis of said tightening element to be controlled, able to generate pulsed eddy currents at the surface of said tightening element to be controlled when said coil is supplied with at least one exciting current pulse, said coil being integrated into a system for generating a magnetic field, said system comprising a cylindrical magnet of magnetization direction parallel to the longitudinal axis of said tightening element to be controlled and placed above said coil so that the axis of revolution of said magnet is substantially coincident with the axis of said coil, and a magnetic circuit that encircles said magnet and said coil with a view to guiding the generated magnetic field, the magnetic circuit is shaped so that the field lines pass through obliquely in the direction of the axis of said coil an interface plane between said transducer and the surface of said tightening element to be controlled, plumb with said coil, the interaction of said field lines and of the pulsed eddy currents being suitable for simultaneously generating the longitudinal and transverse ultrasonic waves in said tightening element to be controlled.

2. A device for controlling tightening by ultrasound comprising an electromagnetic ultrasonic transducer suitable for being electromagnetically coupled to a tightening element to be controlled with a view to generating ultrasonic waves in said tightening element and with a view to receiving and analyzing a return signal, in order to determine a first measurement of the time of flight of generated longitudinal ultrasonic waves and a second measurement of the time of flight of generated transverse ultrasonic waves, so as to deduce therefrom a tightening stress within said tightening element, wherein said transducer is formed from a flat coil of measurement axis parallel to the longitudinal axis of said tightening element to be controlled, able to generate pulsed eddy currents at the surface of said tightening element to be controlled when said coil is supplied with at least one exciting current pulse, said coil being integrated into a system for generating a magnetic field, said system comprising a cylindrical magnet of magnetization direction parallel to the longitudinal axis of said tightening element to be controlled and placed above said coil so that the axis of revolution of said magnet is substantially coincident with the axis of said coil, and a magnetic circuit that encircles said magnet and said coil with a view to guiding the generated magnetic field so that the field lines pass through obliquely in the direction of the axis of said coil an interface plane between said transducer and the surface of said tightening element to be controlled, plumb with said coil, the interaction of said field lines and of the pulsed eddy currents being suitable for simultaneously generating the longitudinal and transverse ultrasonic waves in said tightening element to be controlled, wherein said magnetic circuit comprises:

a conical element formed by a first ferromagnetic polar part having a first end connected to a first pole of said magnet and a free second end of narrow cross section, placed in the plane of said flat coil inside said flat coil, an annular peripheral wall of revolution about said axis of revolution, said wall being formed by a second ferromagnetic polar part that is inclined in the direction of the axis of said flat coil from a first end placed in the plane of a second pole of said magnet to a free second end placed in the plane of said flat coil outside said flat coil, said free second ends of said first and second polar parts defining a gap for channeling the magnetic field located in the plane of said flat coil, and a cylindrical upper wall of revolution about said axis of revolution, said wall being formed by a third ferromagnetic polar part connected to said second pole of said magnet and securely fastened to said first end of said second polar part.

3. The device as claimed in claim 2, wherein said annular peripheral wall has an internal face that is located radially away from said magnet and from said conical element, so as to form a housing suitable for receiving a power-supply cable of the coil.

4. The device as claimed in claim 2, wherein said annular peripheral wall is oriented at substantially 45° with respect to said interface plane.

5. The device as claimed in claim 2, wherein said first, second and third polar parts are made of soft iron.

6. The device as claimed in claim 1, wherein said flat coil is formed from a winding consisting of at least six turns of insulated conductive wire.

7. The device as claimed in claim 1, wherein said magnet is a permanent magnet made of NdFeB.

8. A method for tightening of a tightening element, the method being of the type exploiting measurements of the time of flight respectively of a longitudinal ultrasonic wave and of a transverse ultrasonic wave that propagate through said tightening element, so as to deduce therefrom a tightening stress within said tightening element, comprising the steps of:

coupling a device as claimed in claim 1 to said tightening element with a view to simultaneously generating said longitudinal and transverse ultrasonic waves that propagate through said tightening element;

measuring respective times of flight of said generated longitudinal and transverse ultrasonic waves from return echoes of said longitudinal and transverse ultrasonic waves in a return signal received by said transducer;

computing the ratio $$\left(\frac{t_t}{t_l}\right)$$

of the measured times of flight of the transverse and longitudinal ultrasonic waves;

determining said tightening stress from the ratio of the measured times of flight, by reading the tightening stress corresponding to the obtained ratio of the times of flight, from a calibration curve $$\left(\frac{t_t}{t_l} = f(\sigma)\right)$$

of the ratio of the times of flight $$\left(\frac{t_t}{t_l}\right)$$

as a function of tightening stress ($\sigma$); and controlling the tightening of said tightening element based on said determined tightening stress.

* * * * *